United States Patent
Perino et al.

(10) Patent No.: US 8,339,979 B2
(45) Date of Patent: Dec. 25, 2012

(54) METHOD AND SYSTEM FOR DETECTING A SINGLE DATA FLOW IN AN AGGREGATE PACKET DATA FLOW AND FOR IDENTIFYING THE APPLICATION GENERATING SAID SINGLE DATA FLOW

(75) Inventors: Massimo Perino, Turin (IT); Marco Mellia, Turin (IT); Dario Rossi, Turin (IT); Michela Meo, Turin (IT)

(73) Assignees: Vodafone Group PLC, Newbury, Berkshire (GB); Vodafone Omnitel N.V., Amsterdam (NL); Politecnico di Torino, Turin (IT)

( * ) Notice: Subject to any disclaimer, the term of this patent is extended or adjusted under 35 U.S.C. 154(b) by 328 days.

(21) Appl. No.: 12/602,996

(22) PCT Filed: Jun. 3, 2008

(86) PCT No.: PCT/IB2008/001425
§ 371 (c)(1),
(2), (4) Date: Dec. 3, 2009

(87) PCT Pub. No.: WO2008/149203
PCT Pub. Date: Dec. 11, 2008

(65) Prior Publication Data
US 2010/0177652 A1 Jul. 15, 2010

(30) Foreign Application Priority Data
Jun. 4, 2007 (IT) .............................. MI2007A1141

(51) Int. Cl.
*G01R 31/08* (2006.01)
(52) U.S. Cl. ...................................................... 370/252
(58) Field of Classification Search .................. 370/252, 370/389, 390, 392, 229, 230, 235, 241
See application file for complete search history.

(56) References Cited

U.S. PATENT DOCUMENTS
2005/0220023 A1* 10/2005 Kodialam et al. ............. 370/235
(Continued)

FOREIGN PATENT DOCUMENTS
EP 1 764 951 3/2007
EP 2119105 12/2011

OTHER PUBLICATIONS

Feinstein L et al: "Statistical approaches to DDoS attack detection and response," Proceedings DARPA Information Survivability Conference and Exposition IEEE Comput. Soc Los Alamitos, CA, USA, vol. 1, Jan. 1, 2003, pp. 303-314, XP002495759.

(Continued)

*Primary Examiner* — Kwang B Yao
*Assistant Examiner* — Anh Ngoc Nguyen
(74) *Attorney, Agent, or Firm* — Workman Nydegger

(57) ABSTRACT

The invention relates to a method and a system for detecting a single data flow in an aggregate packet data flow and identifying the application generating the single data flow, this single data flow being divided into messages, each message comprising a plurality of blocks, each block (g) having n bits for identifying $2^n$ block values (i). The method comprises the steps of providing, for each block value (i), an expected frequency value ($E_i$), measuring, for a predefined number (G) of blocks (g), the values Formula (I) of frequency with which each block (g) identifies each block value (i) so as to obtain a plurality of measured frequency values Formula (I), processing, for each block (g), the measured frequency values Formula (I) and the expected frequency values ($E_i$) in order to generate a frequency deviation value Formula (II) representative of the deviation of the measured frequency values Formula (I) with respect to the expected frequency values ($E_i$), and processing the frequency deviation values Formula (II) generated for each block (g) with at least one frequency deviation threshold value ($\chi_{th}$) in order to detect the single data flow and identify the application generating said single data flow.

10 Claims, 1 Drawing Sheet

U.S. PATENT DOCUMENTS

Figure 1:
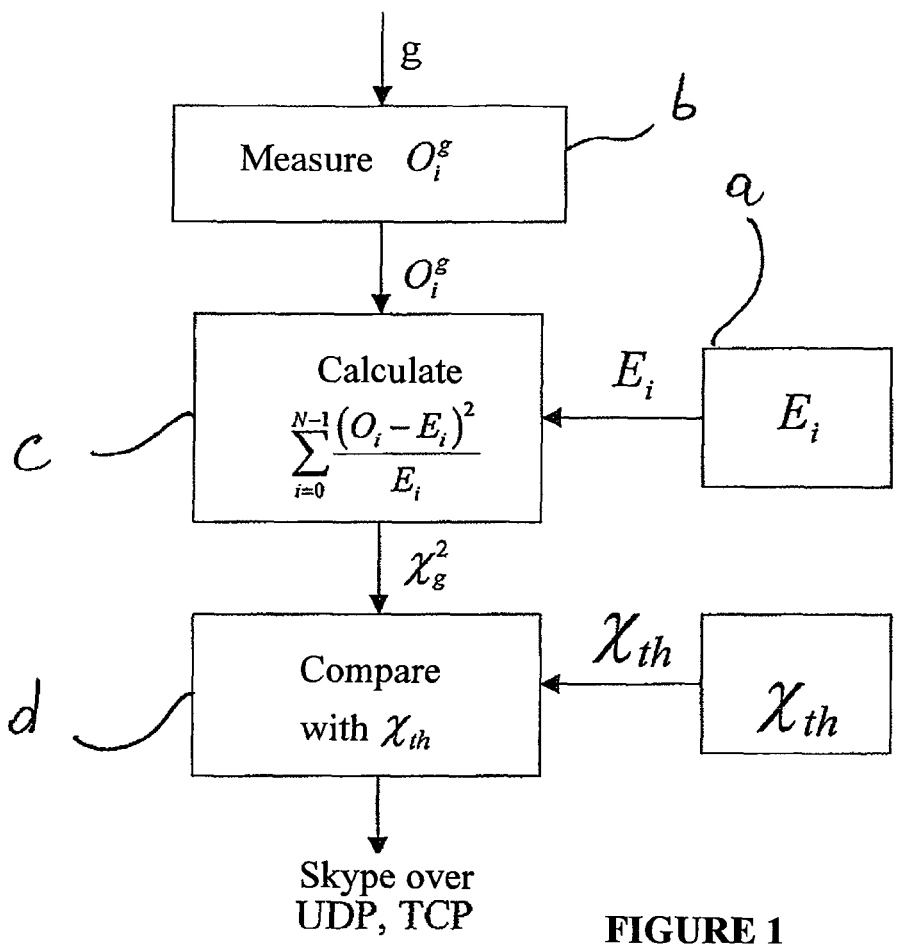

2007/0076611 A1*   4/2007   Magnaghi et al. ............ 370/235
2010/0214933 A1    8/2010   Mellia et al.

OTHER PUBLICATIONS

Dario Bonfiglio et al: "Revealing skype traffic: when randomness plays with you," Proceedings of ACM SIGCOMM, XX, XX, Aug. 27, 2007, pp. 37-48, XP007903883.

Chun-Ming Leung et al: "Network Forensic on Encrypted Peer-to-Peer VoIP Traffics and the Detection, Blocking, and Prioritization of Skype Traffics," Enabling Technologies: Infrastructure for Collaborative Enterprises, 2007, WETICE 2007. 16th IEEE International Workshops on IEEE, Piscataway, NJ, USA, Jun. 1, 2007, pp. 401-408, XP031193638.

* cited by examiner

METHOD AND SYSTEM FOR DETECTING A SINGLE DATA FLOW IN AN AGGREGATE PACKET DATA FLOW AND FOR IDENTIFYING THE APPLICATION GENERATING SAID SINGLE DATA FLOW

The present invention relates to a method and a system for detecting a single data flow in an aggregate packet data flow and for identifying the application generating the single data flow.

In the prior art, there is known the problem of detecting a single data flow in a packet data flow and of identifying the application generating that flow, for example identifying a single voice flow, and the application that generated it, in an aggregate traffic or flow on an IP network.

In particular, such a problem is known with reference to VoIP telephony in which a voice communication is set up over an IP network between two users using unknown and encrypted protocols. A typical example of software that generates voice data flow over an IP network is Skype.

The protocols and algorithms enabling Skype, and most voice programs, to generate voice data flow over an IP network are unknown and often encrypted and are based on encrypting the content.

For this reason it is very difficult to detect the presence of a single data flow generated by a particular application, such as for example Skype, in an aggregate data flow comprising flows generated by various types of applications, whether voice, data transport, video communications, etc.

From the above-described, there emerges the requirement to be capable of detecting the presence of a single data flow in an aggregate packet data flow and of identifying the application generating the single data flow without knowledge of the protocols and algorithms used by the application itself to generate the single data flow and to include such a single data flow in the aggregate packet data flow.

In view of the prior art described, the aim of the present invention is to implement a method and a system for detecting a single data flow in an aggregate packet data flow and identifying the application generating the single data flow, capable of overcoming the drawbacks present in the prior art.

According to the present invention, such an aim is achieved by a method for detecting a single data flow in an aggregate packet data flow and identifying the application generating the single data flow, according to claim 1.

By virtue of the present invention, it is possible to obtain a method for detecting a single data flow in an aggregate packet data flow and identifying the application generating the single data flow over an IP network using a simple technique.

According to a further aspect of the present invention, such an aim is achieved by a system for detecting a single data flow in an aggregate packet data flow and identifying the application generating the single data flow, according to claim 6.

Figure 2:
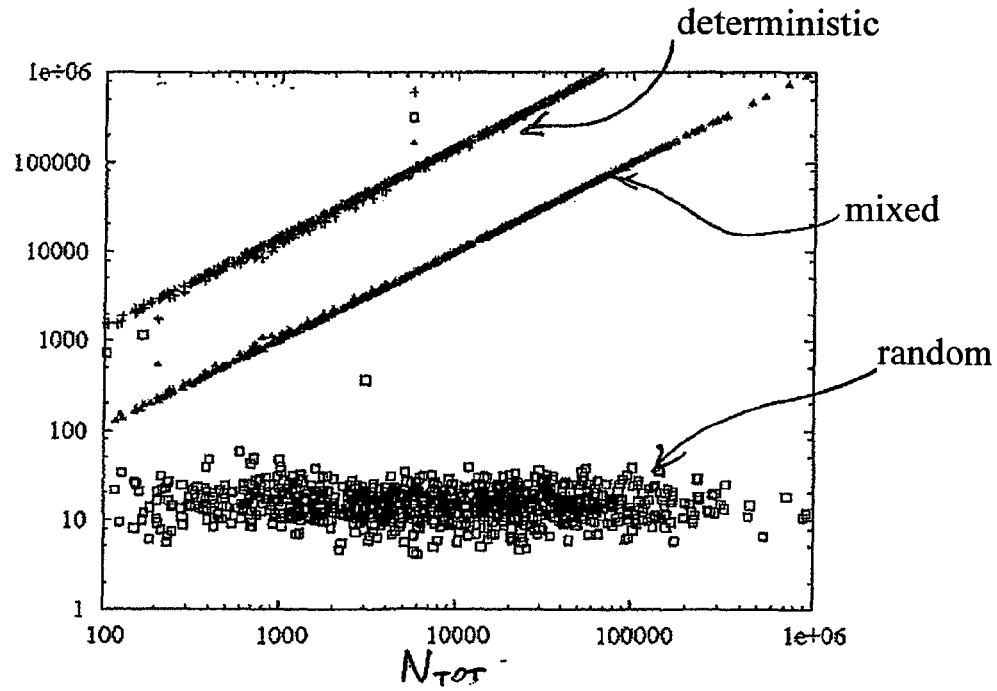

Other features and advantages of the method and system for detecting a single data flow in an aggregate packet data flow and identifying the application generating the single data flow, according to the present invention, will become clear from the following description of a preferred example embodiment, given by way of indication and in a non-limiting manner, with reference to the appended drawings, in which:

FIG. 1 shows a block diagram explaining the method and system for detecting a single data flow in an aggregate packet data flow and identifying the application generating the single data flow according to the present invention, FIG. 2 shows frequency deviation distributions processed for deterministic, random and mixed blocks of bits.

Hereafter in the present description statistical functions for measuring the frequency deviation will be used, in particular the Pearson chi-square function. The Pearson chi-square statistical function is illustrated below.

The Pearson chi-square function provides for checking whether the behaviour of an object, observed for a finite number of times, follows an expected behaviour.

This is carried out by calculating the deviation of the measured values of the object with respect to the expected distribution of values of the object.

It is assumed for example that an object is observed for a number of times $N_{TOT}$ and that the object under observation can take N possible outputs or values for each observation.

If the expected distribution of values is such that the value i, where recurs with a probability $p_i$, then the expected number of events or frequency of i is given by the relationship $E_i = N_{TOT} p_i$. With $O_i$ representing the number of events or frequency of i actually observed during the observation, then the value $$\chi^2 = \sum_{i=0}^{N-1} \frac{(O_i - E_i)^2}{E_i}$$

represents a measurement of the deviation of the observed behaviour with respect to the expected behaviour, i.e. of the observed frequency with respect to the expected frequency.

If the observed object behaves as expected, then the value of $\chi^2$ is distributed according to a chi-square distribution with N−1 degrees of freedom.

The chi-square function can be used even for a single observation. In particular, it is assumed that the value of the observed object is distributed with probabilities $p_i$.

In the case in point of an aggregate packet data flow, the packet data flow is generated by a specific generating application and is divided into messages, each message comprising a plurality of blocks g.

Each block g of the plurality of blocks has n bits for identifying $2^n$ block values i, for example i=0, 1, 2, ..., $2^n-1$.

With reference to the appended drawings, the method for detecting a single data flow in an aggregate packet data flow and identifying the application generating the single data flow comprises the steps of:

a) providing, for each block value i, an expected frequency value $E_i$, b) measuring, for a predefined number G of blocks g of the plurality of blocks, i.e. for Gn bits, the values $O_i^g$ of frequency with which each block g assumes each block value i so as to obtain a plurality of measured frequency values $O_i^g$, c) processing, for each block g, the measured frequency values $O_i^g$ and the expected frequency values $E_i$ in order to generate a frequency deviation value $\chi_g^2$ representative of the deviation of the plurality of measured frequency values $O_i^g$ with respect to the expected frequency values $E_i$, d) processing the frequency deviation values $\chi_g^2$ generated for each block g with at least one frequency deviation threshold value $\chi_{th}$ in order to detect the presence of a single data flow in said aggregate packet data flow and identify the application generating the single data flow.

The single data flow can be both a voice flow and a peer-to-peer (P2P) flow.

In particular, as will be described in detail below, step d) enables the source generating the single data flow, i.e. the application used to generate the detected single data flow, to be determined.

According to one embodiment, step d) comprises the steps of:

d1) processing the frequency deviation values $\chi_g^2$ generated for each block g in order to generate at least one reference frequency deviation value $\chi_{ref}$ for said predefined number of blocks G, and d2) comparing these generated reference frequency deviation values $\chi_{ref}$ with the frequency deviation threshold value $\chi_{th}$ in order to determine the source generating the single data flow.

According to one embodiment, step c) comprises the step of applying the plurality of measured frequency values $O_i^g$ and the expected frequency values $E_i$ to a function of statistical measurement of the frequency deviation.

In particular, the function of statistical measurement of the frequency deviation can be chosen from one of the functions of entropy, mean, variance, chi-square and similar.

In this case, the chi-square function is chosen, expressed by the following formula:

$$\chi_g^2 = \sum_{i=0}^{2^n-1} \frac{(O_i^g - E_i)^2}{E_i}$$

where $\chi_g^2$ corresponds to the frequency deviation value $\chi_g^2$, $O_i^g$ corresponds to the plurality of measured frequency values $O_i^g$, and $E_i$ corresponds to the expected frequency values $E_i$.

The expected frequency values $E_i$ can be obtained as a function of the application which is desired to be identified, or, in the absence of such information a priori, can be distributed uniformly.

With reference to the appended drawings, there is described hereafter the application of the method according to the invention for detecting a single data flow generated by a Voice over IP application, Skype, in an aggregate packet data flow and identifying such an application generating the single data flow.

Since Skype is a closed and proprietary program which uses encryption algorithms, it is not possible to identify a data flow generated by Skype using conventional techniques for analyzing the contents of packets.

However, there is an important difference regarding messages introduced into a network according to the transport protocol underneath used.

For example, the TCP protocol implements a connection-oriented transmission protocol and therefore guarantees that all the segments of data are received in the same sequence as when they are introduced into the network, possibly with a delay.

However the connectionless service for a connection provided by the UDP protocol does not guarantee the delivery of all the data and in the same sequence as when the data items were introduced.

Consequently, a Skype encoder cannot encrypt the whole message but must allow the Skype receiver to extract from the application layer header some additional information for detecting and managing any messages that are lost or delivered out of sequence to the receiver.

This information cannot be protected by encryption but can only be obscured in such a way that it is easily identified upon reception. This portion of the message is called the Start of Message (SoM).

For example, when a message is transported over the TCP protocol, the entire content of the Skype message is encrypted and therefore the bytes of the message randomly take random values. On the other hand, in the case of transport over UDP, only a part of the message is distributed randomly while other parts exhibit statistical properties typical of deterministic data, for example the SoM.

The method described above provides for differentiating therefore the single data flow generated by Skype applications from data flows generated by other applications for generating a data or voice flow over IP, since such applications use different header formats resulting in different distributions of the bytes of the messages.

It is therefore necessary to check whether the frequency deviation values $\chi_g^2$ are such as to satisfy the expected assumption. With this assumption expected, the content features of the message are used, which are summarized in the table below for messages of type End-to-End (E2E) over UDP, End-to-Out (E2O) over UDP and End-to-End or End-to-Out over TCP, where End-to-End represents traffic generated between two host terminals, each of which uses a Skype client, while End-to-Out represents traffic generated between a host terminal and a conventional PSTN terminal.

TABLE

| Skype method | Start of Message (SoM) | | | Payload |
|---|---|---|---|---|
| Byte position | 1-2 | 3 | 4 | 5-... |
| E2E over UDP | Random | Mixed | Random | Random |
| E2O over UDP | Deterministic | Deterministic | Deterministic | Random |
| E2E-E2O over TCP | Random | Random | Random | Random |

For example, the E2E over UDP flow has bytes 1, 2 and 4 encrypted, i.e. random, while byte 3 contains some random bits and some constant bits (mixed in the table), and the start of message bytes of the E2O over UDP flow take deterministic values.

To determine whether a block has a random, deterministic or mixed distribution, the distribution of uniformly distributed bits is considered to be the expected distribution. In that case the expected frequency value E is equal to $N_{TOT}/2^n$ for all the block values i, where $N_{TOT}$ is the number of messages analyzed belonging to the flow.

The generated frequency deviation values 4 are therefore compared with one or more thresholds derived from the chi-square distribution with $2^n-1$ degrees of freedom. These thresholds are indicated by $\chi_{Rnd}^2$, $\chi_{Mix}^2$ and $\chi_{Det}^2$ for random, mixed and deterministic blocks respectively.

The values G, for the predefined number of blocks, and n number of bits can be fixed, for example at n=4 bits and G=16. In that case, this gives the reference chi-square distribution having $2^n-1=15$ degrees of freedom and $E_i=N_{TOT}/16$ for all the block values i=0, ..., 15.

The generated frequency deviation values $\chi_g^2$ and the reference frequency deviation values $\chi_{Rnd}^2$, $\chi_{Mix}^2$, and $\chi_{Det}^2$ are compared for example as follows:

$-E2E$ over $UDP$ $$\max_{g \in G'} \chi_g^2 < \chi_{Rnd}^2 \wedge \min_{g \in \{5,6\}} \chi_g^2 > \chi_{Mix}^2$$

where:
$G'=\{g|1\leq g\leq G, g\neq 5,6\}$ are the blocks g corresponding to the random part of the E2E message, $$\max_{g\in G'} \chi_g^2$$

is a first generated reference frequency deviation value, $$\min_{g\in\{5,6\}} \chi_g^2$$

is a second generated reference frequency deviation value, and $\chi_{Rnd}^2$ and $\chi_{Mix}^2$ are two frequency deviation threshold values.

In essence, it is expected that the blocks g with random distribution have uniform distribution and therefore the generated frequency deviation values $\chi_g^2$ must be relatively low and therefore less than the frequency deviation threshold value $\chi_{Rnd}^2$, and that the blocks g with mixed distribution containing some deterministic blocks have high generated frequency deviation values $\chi_g^2$ and therefore greater than the frequency deviation threshold value $\chi_{Mix}^2$.

$$-E20 \text{ over } UDP$$

$$\max_{g\in 1,\ldots,8} \chi_g^2 < \chi_{Det}^2 \wedge \max_{g=9,\ldots,16} \chi_g^2 < \chi_{Rnd}^2$$

In this case, it is expected that the start of message SoM, i.e. the first 4 bytes, i.e. g=8 blocks of n=4 bits, is deterministic and that the remaining part is random, since the whole message is encrypted.

$$-E2E - E20 \text{ over } TCP$$

$$\max_{g=1,\ldots,16} \chi_g^2 < \chi_{Rnd}^2$$

In these cases, it is expected that all the blocks of bits have random distributions.

Advantageously, the number of messages belonging to the flow $N_{TOT}$ is large. For example, the number $N_{TOT}$ is such that the expected frequency value $E_i \geq 5$ for all the block values i. In the example stated here, this amounts to saying that $$\frac{N_{TOT}}{2^n} \geq 5,$$

i.e. $N_{TOT} \geq 80$ with n=4 bits.

It is also worthwhile noting that the difference between the generated frequency deviation values $\chi_g^2$ for a deterministic or random block g increases as a function of the value of the number of messages belonging to the flow $N_{TOT}$.

For a deterministic block g:

$$\chi_g^2 = \sum_{i=0}^{2^n-1} \frac{(O_i^g - E_i)^2}{E_i}$$

$$= \frac{(N_{TOT} - E)^2 + (2^n - 1)E^2}{E} =$$

$$= N_{TOT}(2^n - 1).$$

Therefore $\chi_g^2$ increases substantially linearly with $N_{TOT}$, therefore the greater the length of the flow, the greater $N_{TOT}$ and the greater the expectation that the block g is deterministic, i.e. exceeds the reference threshold value $\chi_{Det}^2$.

In the case of a mixed block g, if one bit is fixed and the others have random distributions, $O_i=0$ for half of the possible block values i, and $O_i>0$ for the remaining block values i. Since the possible values of i are $2^n$, the generated frequency deviation value $\chi_g^2$ is:

$$\chi_g^2 = \sum_{i=0}^{2^n-1} \frac{(O_i^g - E_i)^2}{E_i}$$

$$= \sum_{i=0}^{2^n-1} \frac{(O_i^g - E)^2}{E} + 2^{n-1}\frac{E^2}{E} =$$

$$= 2\chi_{2^{n-1}-1}^2 + N_{TOT}.$$

where $\chi_{2^{n-1}-1}^2$ is the chi-square function with $2^{n-1}-1$ degrees of freedom. In other words, $\chi_{2^{n-1}-1}^2$ is a value which can be obtained from an observation of random bits with $2^{n-1}$ possible bit values, rather than $2^n$ possible values.

This means that in the case of a block g with a deterministic bit, $\chi_g^2$ still increases linearly with $N_{TOT}$.

In FIG. 2 the generated frequency deviation values $\chi_g^2$ are noted for blocks of mixed, random and deterministic bits on identified flows such as Skype flows. It can be observed how $\chi_g^2$ increases linearly with $N_{TOT}$ both for deterministic blocks and for mixed blocks, where for completely deterministic blocks it has a greater frequency deviation with respect to mixed blocks. In FIG. 2, the values $\chi_g^2$ taken by random blocks that do not depend on $N_{TOT}$ are also indicated. From FIG. 2, it is deduced that mixed, deterministic and random blocks can be differentiated from one another as a function of the generated frequency deviation values $\chi_g^2$ and that the frequency deviation threshold values are not critical parameters for such an identification.

In the example, in order to reduce the number of parameters, one can set $\chi_{Rnd}^2 = \chi_{Mix}^2 = \chi_{Det}^2 = 150$.

The present invention also relates to a system for detecting a single data flow in an aggregate packet data flow and identifying the generating application in the single data flow. The system comprises storage means for storing, for each block value i, an expected frequency value $E_i$, and for storing a frequency deviation threshold value $\chi_{th}$, and measurement means for measuring, for a predefined number G of blocks g of the plurality of blocks, the values $O_i^g$ frequency with which each block g identifies each block value i for generating a plurality of measured frequency values $O_i^g$.

The system also comprises processing means in signal communication with the measurement means and with the storage means for processing, for each block g, the plurality of measured frequency values $O_i^g$ and the expected frequency values $E_i$ in order to generate a frequency deviation value $\chi_g^2$ representative of the deviation of the plurality of measured frequency values $O_i^g$ with respect to the expected frequency values $E_i$, and processing the frequency deviation values $\chi_g^2$ generated for each block (g) with the frequency deviation threshold value $\chi_{th}$ in order to generate a signal representative of the presence of the single data flow in the aggregate packet data flow and representative of the application generating the single data flow.

Advantageously, the method and the system of the present invention can be used in combination with the method and the system for detecting voice data flow in a packet data flow described in Italian patent application no. MI 2006 A 002417 included here for reference.

In summary, the method and the system of Italian patent application MI 2006 A 002417 provide for the packet data flow to be able to be characterized by at least two measurable variables X,Y and provide, for each measurable variable X,Y, a distribution function P{x|C},P{y|C} for the values of each variable X,Y in a voice data flow. Next, the values x,y of each variable X,Y are measured to obtain a sequence of measured values $x^{(k)}$, $y^{(k)}$ on a number K of blocks and each measured value $x^{(k)}$, $y^{(k)}$ is applied to the respective distribution function P{x|C}, P{y|C} in order to generate a sequence of values of likelihood $B_x^{(k)}$, $B_y^{(k)}$ from which respective average likelihood values $E[B_x]$, $E[B_y]$ are generated. Lastly, these average values are processed to generate a reference likelihood value B which, compared with a threshold likelihood value $B_{min}$, provides for detecting the presence of voice data flow in the packet data flow.

From experiments that have been performed, it has emerged that the combined use of the method and system described in Italian patent application MI 2006 A 002417 and the method and system of the present invention is extremely effective in detecting and classifying any voice over IP traffic and in detecting and classifying voice traffic generated by a Skype application and transported either over UDP or over TCP. It was also demonstrated that both methods and both systems mentioned above exhibit a high level of robustness.

As can be appreciated from that which has been described above, the method and system according to the present invention provide for meeting the requirements and overcoming the drawbacks referred to in the introductory part of the present description with reference to the prior art.

In particular, the method and system according to the invention provide for detecting the presence of any type of voice flow, even an encrypted one.

Clearly, in order to satisfy the contingent and specific requirements, a person skilled in the art may introduce many modifications and variants to the method and system according to the invention described above, all however contained within the scope of protection of the invention, which scope of protection is defined by the following claims.

The invention claimed is:

1. Method for detecting a single data flow in an aggregate packet data flow and for identifying an application generating said single data flow, said aggregate packet data flow being divided in messages, each message comprising a plurality of blocks, each block (g) of said plurality of blocks having n bits for identifying $2^n$ possible block values (i), said method being characterized in that it comprises the following steps:
 a) providing, for each block value (i), an expected frequency value ($E_i$),
 b) measuring, for a predefined number (G) of blocks (g) of said plurality of blocks, the frequency values ($O_i^g$) which each block (g) identifies each block value (i) so as to obtain a plurality of measured frequency values ($O_i^g$),
 c) processing, for each block (g), said plurality of measured frequency values ($O_i^g$) and the expected frequency values ($E_i$) for generating a frequency deviation value ($\chi_g^2$) representative of the deviation of the plurality of measured frequency values ($O_i^g$) with respect to the expected frequency values ($E_i$),
 d) processing the frequency deviation values ($\chi_g^2$) generated for each block (g) with at least one frequency deviation threshold value ($\chi_{th}$) for detecting said single data flow in said aggregate packet data flow and for identifying the application generating said single data flow.

2. Method according to claim 1, wherein said step d) comprises the steps of:
 d1) processing the frequency deviation values ($\chi_g^2$) generated for each block (g) for generating a reference frequency deviation value ($\chi_{ref}$) for said predefined number of blocks (G),
 d2) comparing said generated reference frequency deviation value ($\chi_{ref}$) with said at least one frequency deviation threshold value ($\chi_{th}$) for identifying said application generating said single data flow.

3. Method according to claim 1 or 2, wherein said step c) comprises the step of applying the plurality of measured frequency values ($O_i^g$) and the expected frequency values ($E_i$) to a function of statistical measurement of the frequency deviation.

4. Method according with claim 3, wherein said function of statistical measurement of the frequency deviation is chosen between one of the function entropy, mean, variance, or chi square.

5. Method according to claim 3, wherein said function of statistical measurement of the frequency deviation is the chi-square function:

$$\chi_g^2 = \sum_{i=0}^{2^n-1} \frac{(O_i^g - E_i)^2}{E_i}$$

where
$\chi_g^2$ corresponds to said frequency deviation value ($\chi_g^2$),
$O_i^g$ corresponds to said plurality of measured frequency values ($O_i^g$),
$E_i$ corresponds to said expected frequency values ($E_i$).

6. System for detecting a single data flow in an aggregate packet data flow and identifying an application generating said single data flow, said aggregate packet data flow being divided into messages, each message comprising a plurality of blocks, each block (g) of said plurality of blocks having n bits for identifying $2^n$ possible block values (i), said system comprising:
 storage means for storing, for each block value (i), an expected frequency value ($E_i$) and for storing a frequency deviation threshold value ($\chi_{th}$),
 measurement means for measuring, for a predefined number (G) of blocks (g) of said plurality of blocks, the values ($O_i^g$) of frequency with which each block (g) identifies each block value (i) in order to generate a plurality of measured frequency values ($O_i^g$),
 processing means in signal communication with said measurement means and with said storage means for:
 processing, for each block (g), said plurality of measured values ($O_i^g$) of frequency and the expected frequency values ($E_i$) in order to generate a frequency deviation value ($\chi_g^2$) representative of the deviation of the plurality of measured frequency values ($O_i^g$) with respect to the expected frequency values ($E_i$), and
 processing the frequency deviation values ($\chi_g^2$) generated for each block (g) with said at least one frequency deviation threshold value ($\chi_{th}$) in order to generate a signal representative of the presence of said single data flow in said aggregate packet data flow and representative of the application generating said single data flow.

7. System according to claim 6, wherein said processing means are able to process the frequency deviation values ($\chi_g^2$) generated for each block (g) in order to generate a reference frequency deviation value ($\chi_{ref}$) for said predefined number of blocks (G), and compare said generated reference frequency deviation value ($\chi_{ref}$) with said at least one frequency deviation threshold value ($\chi_{th}$) in order to identify said application generating said single data flow.

8. System according to claim 6 or 7, wherein said processing means are able to apply the plurality of measured frequency values ($O_i^g$) and the expected frequency values ($E_i$) to a function of statistical measurement of the frequency deviation in order to generate the frequency deviation value ($\chi_g^2$) representative of the deviation of the plurality of measured frequency values ($O_i^g$) with respect to the expected frequency values ($E_i$).

9. System according to claim 8, wherein said function of statistical measurement of the frequency deviation is chosen from among one of the functions of entropy, mean, variance, or chi-square.

10. System according to claim 8, wherein said function of statistical measurement of the frequency deviation is the chi-square function:

$$\chi_g^2 = \sum_{i=0}^{2^n-1} \frac{(O_i^g - E_i)^2}{E_i}$$

where:
$\chi_g^2$ corresponds to said frequency deviation value ($\chi_g^2$),
$O_i^g$ corresponds to said plurality of measured frequency values ($O_i^g$),
$E_i$ corresponds to said expected frequency values ($E_i$).

* * * * *